United States Patent
Major et al.

(10) Patent No.: US 10,042,680 B2
(45) Date of Patent: Aug. 7, 2018

(54) CROSS-DOMAIN DATA SHARING WITH PERMISSION CONTROL

(71) Applicants: BlackBerry Limited, Waterloo (CA); 2236008 Ontario Inc., Waterloo (CA)

(72) Inventors: Daniel Jonas Major, Ottawa (CA); Ian David Peters, London (GB); Glenn Daniel Wurster, Kitchener (CA); David Francis Tapuska, Waterloo (CA)

(73) Assignees: BlackBerry Limited, Waterloo, Ontario (CA); 2236008 Ontario Inc., Waterloo, Ontario (CA)

( * ) Notice: Subject to any disclaimer, the term of this patent is extended or adjusted under 35 U.S.C. 154(b) by 391 days.

(21) Appl. No.: 14/334,360

(22) Filed: Jul. 17, 2014

(65) Prior Publication Data

US 2016/0019104 A1    Jan. 21, 2016

(51) Int. Cl.
*G06F 3/048* (2013.01)
*G06F 9/54* (2006.01)
*G06F 21/62* (2013.01)
*G06F 3/01* (2006.01)

(52) U.S. Cl.
CPC .......... *G06F 9/543* (2013.01); *G06F 21/6218* (2013.01)

(58) Field of Classification Search
CPC .............................. G06F 9/543; G06F 21/6218
See application file for complete search history.

(56) References Cited

U.S. PATENT DOCUMENTS

| 6,895,409 | B2 * | 5/2005 | Uluakar | G06F 8/20 707/769 |
| 9,213,850 | B2 * | 12/2015 | Barton | G06F 21/604 |
| 9,460,293 | B1 * | 10/2016 | Kashyap | G06F 21/60 |
| 2003/0054794 | A1 * | 3/2003 | Zhang | H04W 88/04 455/403 |
| 2004/0230572 | A1 * | 11/2004 | Omoigui | G06F 17/30528 |
| 2005/0066335 | A1 * | 3/2005 | Aarts | G06F 9/543 719/316 |

(Continued)

OTHER PUBLICATIONS

PCT International Search Report; Application No. PCT/EP2015/066500; dated Oct. 12, 2015; 3 pages.

(Continued)

*Primary Examiner* — Nicholas Augustine
(74) *Attorney, Agent, or Firm* — Conley Rose, P.C.; J. Robert Brown, Jr.; Joseph J. Funston, III

(57) ABSTRACT

An electronic device may maintain separate OS domains associated with security permissions. The OS domain may implement separate corresponding clipboard services. A clipboard agent or clipboard mediator service may receive a clipboard data request from a first application. The clipboard agent may determine which OS domain has most recently processed a store command associated with storing data in a corresponding clipboard service of the OS domain. The clipboard agent associated with the OS domain that most recently stored content may determine whether to send the data from the corresponding clipboard service based at least in part on permissions associated with the OS domain. Security of the clipboard access may be enforced on a per domain basis. Access to clipboard content may be mediated at the time of the request without a need to share data prior to the request.

27 Claims, 15 Drawing Sheets

(56) References Cited

U.S. PATENT DOCUMENTS

| | | | | |
|---|---|---|---|---|
| 2007/0011749 A1* | 1/2007 | Allison | ............... | G06F 21/6209 |
| | | | | 726/26 |
| 2011/0314389 A1* | 12/2011 | Meredith | ................... | G06F 8/60 |
| | | | | 715/751 |
| 2013/0013400 A1* | 1/2013 | Kim | .................... | G06Q 30/0241 |
| | | | | 705/14.49 |
| 2013/0013401 A1* | 1/2013 | Kim | .................... | G06Q 30/0241 |
| | | | | 705/14.49 |
| 2013/0013987 A1* | 1/2013 | Kim | ................. | G06F 17/30882 |
| | | | | 715/201 |

OTHER PUBLICATIONS

PCT Written Opinion of the International Searching Authority; Application No. PCT/EP2015/066500; dated Oct. 12, 2015; 7 pages.
Android Developers; "Copy and Paste"; http://developerandroid.com/guide/topics/text/copy-paste.html; Jun. 25, 2012; 16 pages.
PCT International Preliminary Report on Patentability; Application No. PCT/EP2015/066500; dated Oct. 14, 2016; 31 pages.
PCT Written Opinion of the International Preliminary Examining Authority; Application No. PCT/EP2015/066500; dated Jul. 20, 2016; 8 pages.

* cited by examiner

EXAMPLE PERMISSIONS

1000

| # | Description |
|---|---|
| 1010 | ALLOW – RELEASE DATA FROM FIRST DOMAIN TO SECOND DOMAIN |
| 1020 | LOG – RELEASE DATA FROM FIRST DOMAIN TO SECOND DOMAIN, KEEP RECORD OF THE DATA RELEASED |
| 1030 | DENY – DO NOT RELEASE DATA FROM FIRST DOMAIN TO SECOND DOMAIN |
| | ○ ○ ○ |
| 1040 | KEYWORD CHECK – RELEASE DATA ONLY IF IT DOES NOT CONTAIN CERTAIN KEYWORDS (E.G., "CONFIDENTIAL", "RESTRICTED") |
| 1050 | APPLICATION-SPECIFIC – PERMISSION IS GRANTED OR DENIED BASED ON EITHER SOURCE APPLICATION OR DESTINATION APPLICATION |
| 1060 | TIME-SPECIFIC – PERMISSION GRANTED DURING SPECIFIED DAYS AND/OR TIMES |
| 1070 | LOCATION-SPECIFIC – PERMISSION IS GRANTED WHEN THE ELECTRONIC DEVICE IS AT SPECIFIED LOCATIONS |
| 1080 | META-DATA BASED PERMISSION – PERMISSION IS BASED ON META DATA ASSOCIATED WITH THE CLIPBOARD DATA |
| 1090 | CONTENT-BASED PERMISSIONS – PERMISSION IS BASED ON DATA TYPE (OR CONTENT VARIENT) AND/OR SECURITY POLICY |

FIG. 10

CROSS-DOMAIN DATA SHARING WITH PERMISSION CONTROL

BACKGROUND

Embodiments of the inventive subject matter generally relate to the field of electronic devices, and, more particularly, to an electronic device having more than one operating system domain for security control.

An electronic device, such as a computer, smart phone, laptop, tablet, handheld gaming device, or other device may have the capability of executing applications for the convenience of a user of the device. Frequently, these types of devices may be used for both personal and work activities. The device may establish separate domains (operating system domains) that may include different user accounts, applications, and network resources that are separated by security protocols. Typically, information from a first domain is not provided to a second domain because of the applicable security and separation of information between domains. A user of the electronic device may be accustomed to some operating system features, such as a clipboard service, which can store content from an application. To avoid unintended exfiltration of data from a secure domain, it is desirable to manage data storage and retrieval associated with the clipboard service, while providing a seamless user experience to the user of the device.

BRIEF DESCRIPTION OF THE DRAWINGS

The present embodiments may be better understood, and numerous objects, features, and advantages made apparent to those skilled in the art by referencing the accompanying drawings.

FIG. 10 depicts example permissions in accordance with an embodiment of this disclosure.

DESCRIPTION OF EMBODIMENT(S)

Figure 1:
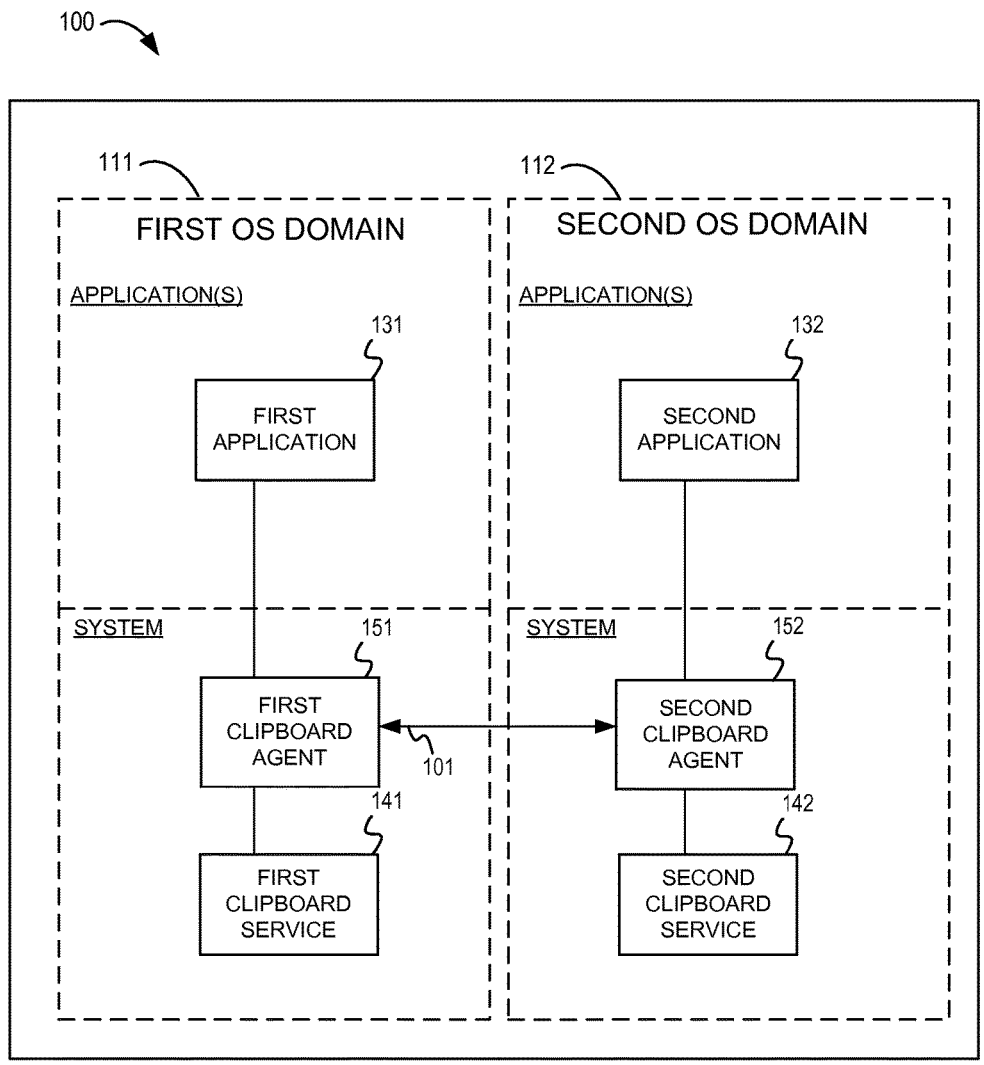
FIG. 1 depicts an electronic device implementing cross-domain data sharing using clipboard agents in accordance with an embodiment of this disclosure.

The description that follows includes exemplary systems, methods, techniques, instruction sequences and computer program products that embody techniques of the present inventive subject matter. However, it is understood that the described embodiments may be practiced without these specific details. For instance, although examples refer to copy and paste features of a clipboard service, other commands or other operating system services may implement cross domain data sharing using permission control. For example, a file sharing service may implement cross-domain data sharing with permission controls according to this disclosure. In other instances, well-known instruction instances, protocols, structures and techniques have not been shown in detail in order not to obfuscate the description.

For various reasons (e.g., security), an electronic device can be configured to host multiple operating system (OS) instances (referred to herein as "operating system domains" or "OS domains"). Domains may be used to logically separate information (e.g., files, applications, certificates, configuration data, network connections, data, etc.) utilized on the device. Each domain may include one or more resources, including data and applications, and one or more policies regarding use or access of the domain resources. A domain may prevent a user from accessing resources without authorization. When operating within one domain, access to data outside of the domain may be controlled or restricted.

In one scenario, domains may be used to separate data which may be proprietary or confidential. An electronic device may have multiple domains. For example, a first OS domain can be designated as a personal domain for personal activities. The first OS domain can host consumer oriented applications (e.g., a social network application, restaurant location applications) and an e-mail application configured for personal e-mail accounts. A second OS domain may be designated as a work domain for work activities. For example, the second OS domain can host various productivity applications and an e-mail application configured for a work account. Other domains could be created, such as for managing different personas or for different users of the same electronic device.

An operating system of an electronic device may provide features, such as a clipboard service which enable a user to store data from an application for retrieval in another application. However, when multiple operating system domains are implemented on an electronic device, it is desirable for the user experience to be consistent. A user may expect there to be only a single clipboard service regardless of the different operating system domains. Furthermore, the clipboard service may be used to store data from one operating system domain that could be retrieved in another operating system domain. It is desirable to manage permissions associated with clipboard features so that domain security can be maintained. The present disclosure provides various embodiments to provide the consistent user experience across multiple domains while maintaining security of data based on domain settings. Data may be shared across domains depending on permission control. Furthermore, embodiments of the present disclosure may postpone data sharing from an operating system domain until the data is requested so that a decision regarding the data sharing permission occurs when the data is requested. In an embodiment, the cross-domain sharing with permission control may be implemented without modifying existing operating system services.

In one embodiment, an electronic device may maintain separate OS domains having separate corresponding clipboard services. A clipboard agent or clipboard mediator service may receive (e.g., intercept) a clipboard data request from a first application. The clipboard agent may determine which OS domain has most recently processed a store command associated with storing data in a corresponding clipboard service of the OS domain. The clipboard agent associated with the OS domain that most recently stored content may determine whether to send the data from the corresponding clipboard service based at least in part on permissions associated with the OS domain.

FIG. 1 depicts an electronic device 100 implementing cross-domain data sharing using clipboard agents in each operating system domain in accordance with an embodiment of this disclosure. The electronic device 100 has two operating system domains, a first OS domain 111 and a second OS domain 112. It should be noted that the number of domains that may be established on the electronic device 100 are not limited. For example, a device may include multiple domains including a first personal domain, an enterprise, business, or work domain, a second personal domain, and a shared domain. In one embodiment, a personal domain may be managed by the user of the device and an enterprise domain may be managed by an enterprise (e.g., corporate administrator). In other embodiments, the enterprise may manage the personal domain as well as the enterprise domain.

Each domain may be associated with one or more application(s). For example, applications may be installed and executed in each domain. In FIG. 1, the first OS domain 111 executes a first application 131. The second OS domain 112 executes a second application 132. Each domain may also provide one or more system services. Some system services may be redundant to corresponding system services in another domain. For example, the first OS domain 111 provides a first clipboard service 141. The second OS domain 112 provides a second clipboard service 142. The first clipboard service 141 and second clipboard service 142 may be provided by a vendor of the operating system software, while the first application 131 and second application 132 may be provided by another entity.

In one embodiment of this disclosure, existing system services may be extended to include enhanced functionality. For example, a first clipboard agent 151 may extend the functionality of the first clipboard service 141. A second clipboard agent 152 may extend the functionality of the second clipboard service 142. The first clipboard agent 151 and second clipboard agent 152 may coordinate via a cross-domain protocol (shown as arrow 101). For example, a cross-domain inter-process communication (IPC) technique may allow the first clipboard agent 151 and second clipboard agent 152 to share information about clipboard services. While the first clipboard agent 151 is shown as a separate block from the first clipboard service 141, in some embodiments, the first clipboard agent 151 may be implemented as a portion (or a modification) of the first clipboard service 141. Similarly, the second clipboard agent 152 may be integrated as a portion (or modification) of the second clipboard service 142.

The first clipboard agent 151 and second clipboard agent 152 may store an indicator of which OS domain (first OS domain 111 or second OS domain 112) most recently processed a command associated with storing data in a corresponding clipboard service (first clipboard service 141 or second clipboard service 142, respectively). When content is stored in either the first clipboard service 141 or second clipboard service 142, the content may be considered the most recently stored clipboard data. Later, when a clipboard request (associated with a paste command) is generated in either OS domain, the corresponding clipboard agent may process the clipboard request. The clipboard agent may determine which OS domain has the most recently stored clipboard data. If the OS domain with the most recently stored clipboard data is the "local" OS domain (i.e., the same OS domain as the clipboard agent processing the clipboard request), the clipboard agent may forward the clipboard request to the local clipboard service. If the OS domain with the most recently stored clipboard data is a different OS domain (i.e., not the same OS domain as the clipboard agent processing the clipboard request), the clipboard agent may forward the clipboard request to the corresponding clipboard agent in the different OS domain.

When a clipboard agent (in a local OS domain) receives a clipboard request from another clipboard agent (i.e., from a different OS domain), the clipboard agent may determine whether to send the local clipboard data responsive to the request based at least in part on permissions associated with the local OS domain. Various permissions may be set in association with the domain to manage the outflow of clipboard data from a local clipboard service. For example, the permissions for first OS domain 111 may restrict the outflow of data to the second OS domain 112. In a second example, the first OS domain 111 may allow the outflow of data to the second OS domain 112. In another example, the first OS domain 111 may allow for the outflow of data, but may also log the data so that it can be later reviewed by an administrator responsible for information security of the first OS domain 111.

Because first clipboard service 141 stores clipboard data for the first OS domain 111 and the first clipboard agent 151 and second clipboard agent 152 can coordinate access to the first clipboard service 141, it is not necessary to share the data to the second clipboard service 142. The clipboard data is maintained in the OS domain from which it originated. The clipboard data is shared to another OS domain only upon request from the other OS domain and only after the permissions can be verified at the time of the request. As such, cross-domain data sharing with permission control may be achieved.

In some embodiments, more granular permissions may also be enforced by the first clipboard agent 151 or the second clipboard agent 152. For example, the clipboard data may be examined for keywords to determine whether to share the clipboard data. In one embodiment, application-specific permissions could be defined. For example, a clipboard agent may enforce permissions based on the source application that stored the clipboard data and the destination application that is requesting the clipboard data. The application-specific permissions could be defined for both intra-domain clipboard requests as well as inter-domain clipboard requests. Another granular permission may be based on a data type of the clipboard data. For example, the clipboard data may have an associated MIME type (e.g., "image/jpeg").

In an embodiment, permissions may be based on meta-data regarding the clipboard data. For one example, permissions may be defined based on the data type, such that some data types may be allowed to be shared to another domain, while other data types might be restricted. In another example, time-based permissions may also be used. The clipboard data may be associated with a timestamp indicated the time the clipboard data was stored. Depending on how much time has passed since the clipboard data was stored, the permissions may allow or restrict the sharing of the clipboard data. In another example, permissions may be based on meta-data stored with the clipboard data may. The meta-data may include information regarding the time, application source, data type, security class, or other information regarding the clipboard data.

Figure 2:
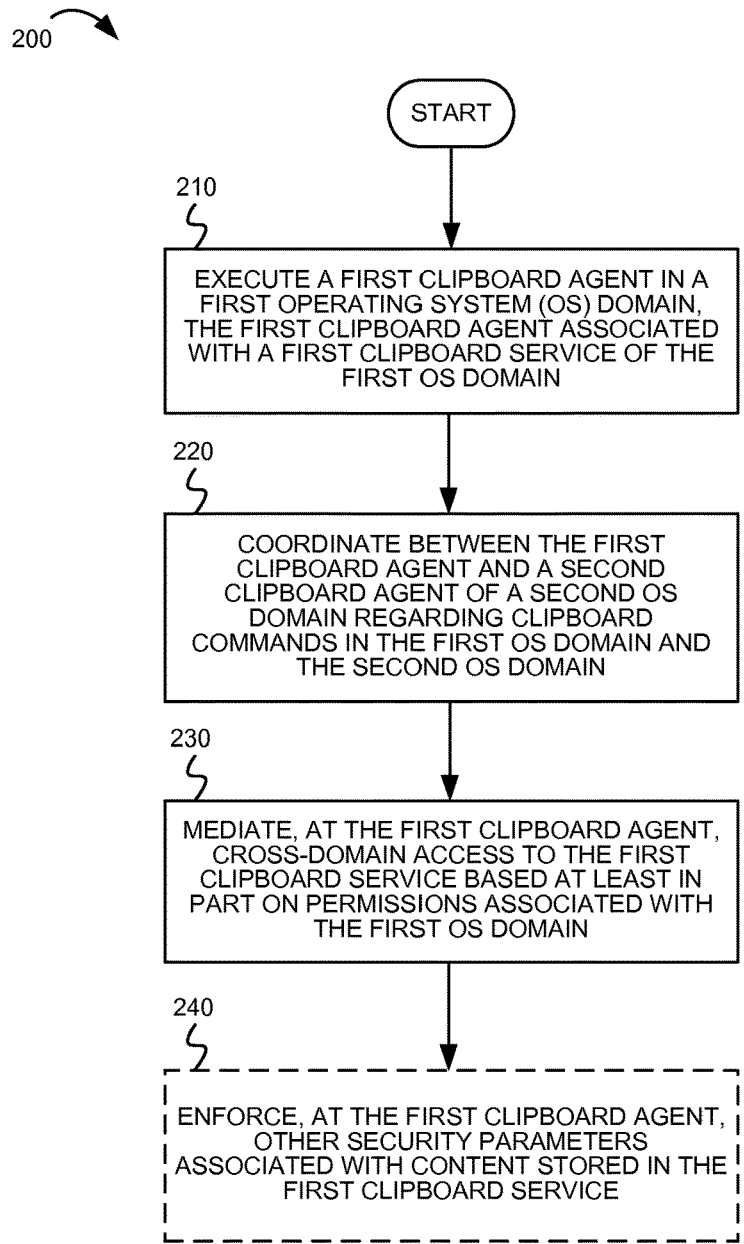
FIG. 2 depicts a flowchart of cross-domain data sharing with permission control in accordance with an embodiment of this disclosure.

FIG. 2 depicts a flowchart (flow 200) of cross-domain data sharing with permission control in accordance with an embodiment of this disclosure.

At block 210, an electronic device may execute a first clipboard agent in a first operating system (OS) domain, the first clipboard agent associated with a first clipboard service of the first OS domain.

At block 220, the electronic device may coordinate between the first clipboard agent and a second clipboard agent of a second OS domain regarding clipboard commands in the first OS domain and the second OS domain.

At block 230, the electronic device may mediate, at the first clipboard agent, cross-domain access to the first clipboard service based at least in part on permissions associated with the first OS domain Optionally, at block 240 the electronic device may enforce, at the first clipboard agent, other security parameters associated with content stored in the first clipboard service. For example, the first clipboard agent may implement keyword filtering, application-specific permissions, time-based permissions, location-based permissions, meta-data-based permissions, or other security parameters to limit access to the content stored in the first clipboard service.

Figure 3:
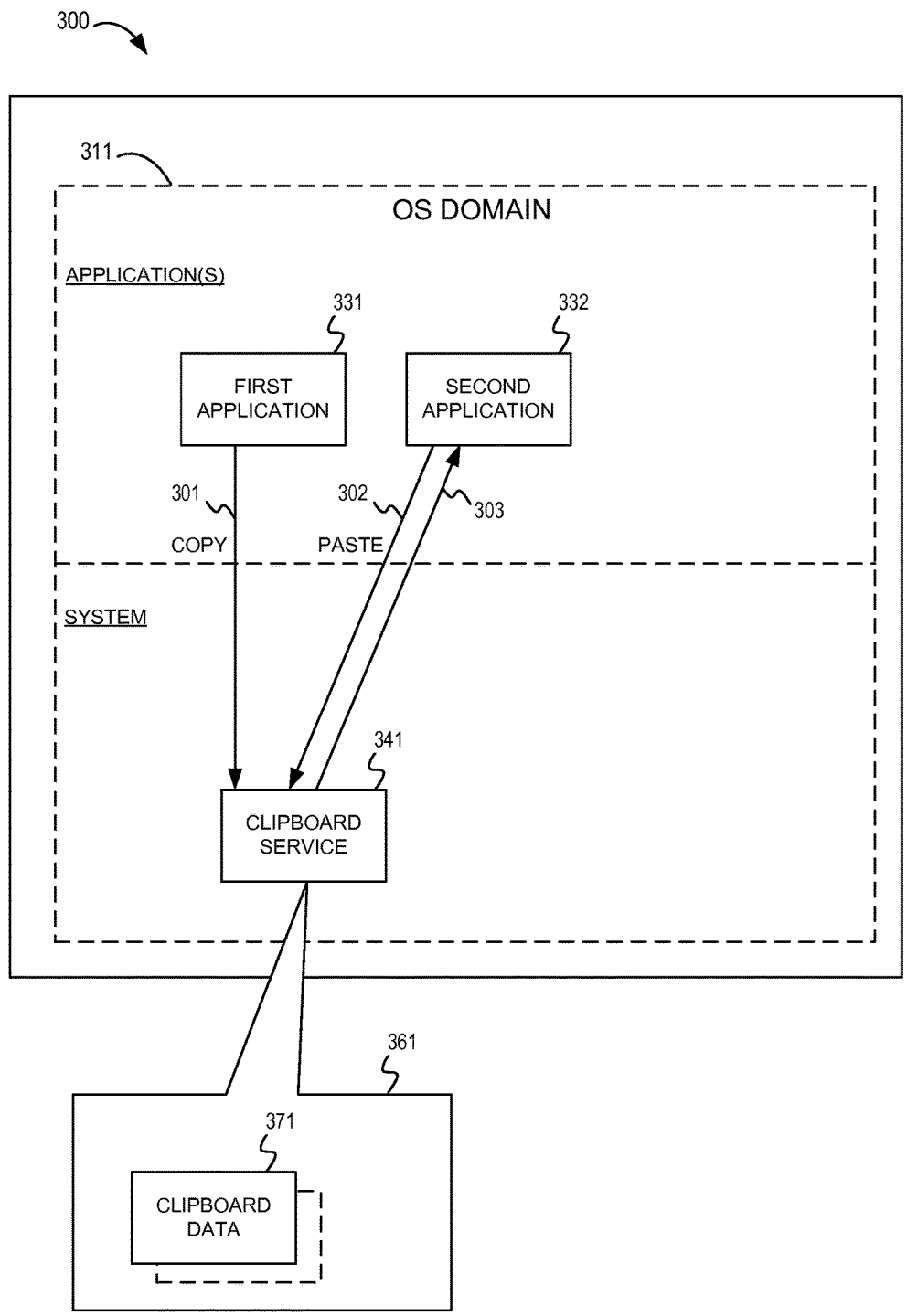
FIG. 3 depicts an electronic device having a single OS domain according to the prior art.

FIG. 3 depicts an electronic device 300 having a single OS domain according to the prior art. FIG. 3 illustrates a copy-and-paste scenario that would occur in a traditional electronic device having only one OS domain. The copy-and-paste scenario will be used in further example scenarios described in FIGS. 4-6.

In FIG. 3, the electronic device 300 has an OS domain 311 that provides a clipboard service 341. There are two applications installed—a first application 331 and a second application 332. In a common scenario, the user may have the first application 331 active in the foreground and initiates a "copy" command. The copy command is associated with storing data in the clipboard service 341. It should be noted that a "cut" command may behave similarly with regard to the clipboard service 341. Together, "copy" and "cut" are examples of a store command associated with storing data in the clipboard service. In the example scenario, the copy command in the first application 331 invokes a store command 301 to the clipboard service 341. The store command 301 may include the content from the first application 331 to store in the clipboard service 341. The content may be text, image, video, audio, or other data. The content may also be a URI or may be a reference to an action to be performed (sometimes referred to as an "intent"). Any variety of data (files, text, images, etc.) may be stored by the clipboard service 341. The content may be structured or unstructured. For example, the content may be structured to include a MIME type and binary data. In this disclosure, the terms content, clip, or clipboard data 371 (may interchangeably refer to information from an application that is stored or managed by a clipboard service.

As a result of the store command 301, the clipboard service 341 stores clipboard data 371. FIG. 3 illustrates a clipboard manager 361 which may store multiple clips. For simplicity, in the following examples, only one clip is maintained by each clipboard service. However, it should be clear that each clipboard service may maintain a history of stored clipboard data 371. The clipboard data 371 may be stored in a memory (not shown) managed by the clipboard service 341.

Returning to the example scenario, at some time after copying the content (clipboard data 371) from the first application 331 to the clipboard service 341, the user may wish to perform a "paste" command. The paste command may be an operation in a variety of applications, including the first application 331 or second application 332. In the example illustrated in FIG. 3, the paste command is described with respect to the second application 332. As a result of the paste command, the second application 332 may send a clipboard request 302 to the clipboard service 341. The clipboard service 341 may retrieve the clipboard data 371 and send a clipboard response 303 to the second application 332. The second application 332 may then use the clipboard content to complete the paste operation.

In another example, the second application 332 may register a "subscription" (not shown) to the clipboard service 341 so that the second application 332 is notified whenever new data is stored by the clipboard service 341. Upon processing the store command 301, the clipboard service 341 may send a notification to the second application 332 that new data has been stored by the clipboard service 341. The second application 332 may then send the clipboard request 302. It is noted that the subscription example, the associated clipboard request 302 and clipboard response 303 may occur in the background. The operations occurring in the background may be performed irrespective of user input and may occur even if the second application 332 is not active in the foreground of the user interface.

In the example copy-and-paste scenario in FIG. 3, the first application 331 and second application 332 are both in the same OS domain 311 and there are no other OS domains to enforce data security. The next several figures describe an electronic device 100 in which two OS domains are present. As noted previously, more than two domains could be present in some implementations.

Figure 4:
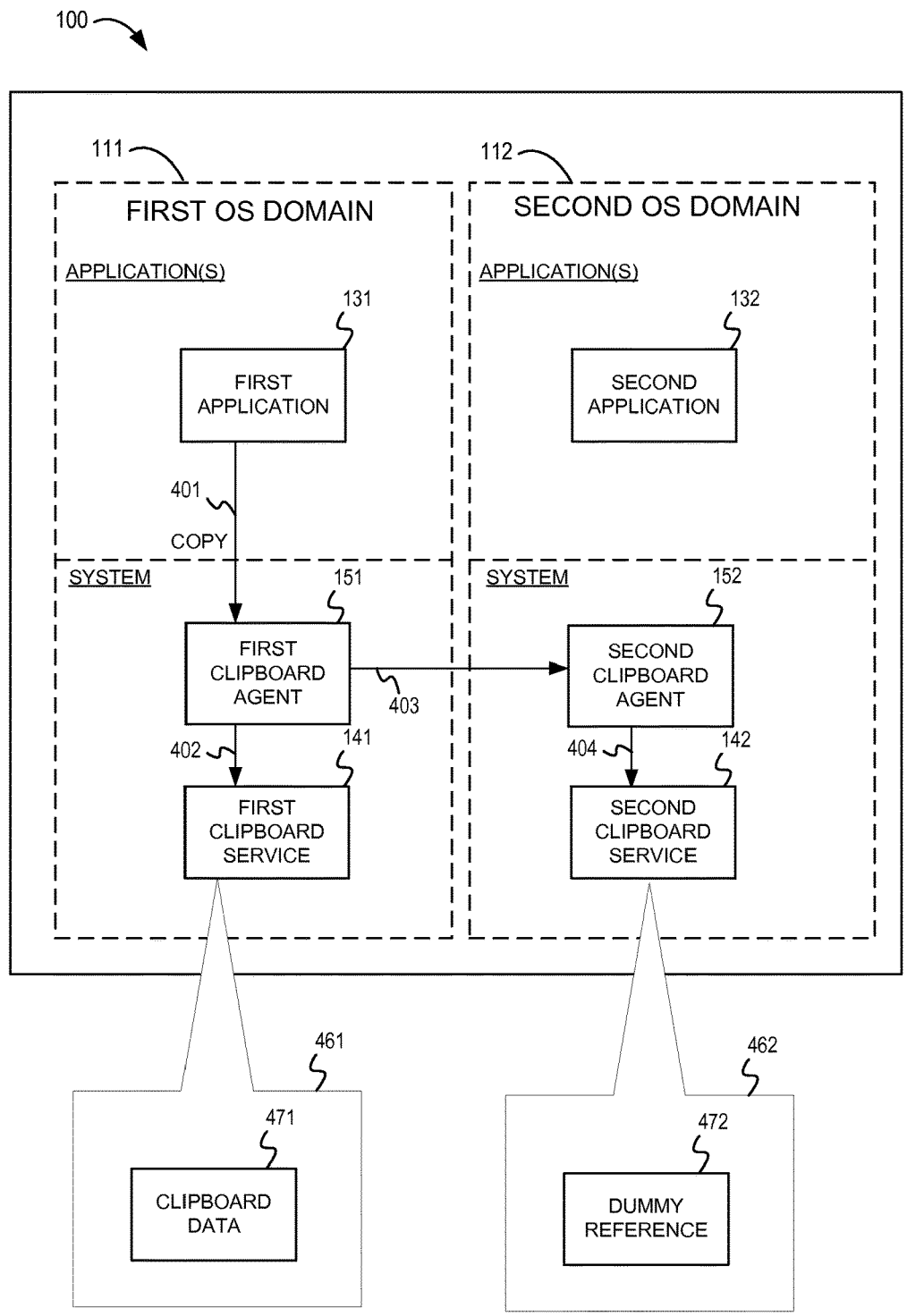
FIG. 4 depicts an electronic device storing content in a clipboard via an associated clipboard agent in accordance with an embodiment of this disclosure.

FIG. 4 depicts a copy operation. The electronic device 100 includes a first OS domain 111 and a second OS domain 112. A first application 131 is present in the first OS domain 111. A second application 132 is present in the second OS domain 112. The first OS domain 111 provides a first clipboard service 141, and the second OS domain 112 provides a second clipboard service 142. In the electronic device 100, the first clipboard agent 151 and second clipboard agent 152 will coordinate regarding clipboard commands in the first OS domain 111 and second OS domain 112. The first clipboard agent 151 and second clipboard agent 152 may communicate when a store command is directed to either the first clipboard service 141 or second clipboard service 142.

In one embodiment, the first clipboard agent 151 may be implemented as a separate system process as the first clipboard service 141. In another embodiment, the first clipboard agent 151 may be integrated as a portion (or modification) of the first clipboard service 141. For example, the first clipboard agent 151 may be implemented as a portion (e.g., a procedure, subroutine, module, class, etc.) of the first clipboard service 141. In this disclosure, the clipboard agent and clipboard service are described as separate components to distinguish functionality. A clipboard agent is described as intercepting commands to the clipboard service. However, in an embodiment in which the clipboard agent is implemented as part of the clipboard service, intercepting a command may include the clipboard service first receiving the command and performing the functionality of the clipboard agent based on the command.

In the copy operation in FIG. 4, the first application 131 sends a store command 401 directed at the first clipboard service 141. Different from FIG. 3, in FIG. 4, the first clipboard agent 151 may intercept commands that would otherwise be directed from the first application 131 to the first clipboard service 141. The first clipboard agent 151 may receive (e.g., intercept) the store command 401 from the first application 131 to the first clipboard service 141. Responsive to the store command 401, the first clipboard agent 151 may forward the store command (shown as store command 402) to the first clipboard service 141 to cause the clipboard data to be stored at the first clipboard service 141. It is noted that the forwarded store command 402 may not be identical to the original store command 401. For example, the first clipboard agent 151 may modify the original store command 401 prior to generating and forwarding the new store command 402 to the first clipboard service 141. As a result of the store command 402 to the first clipboard service 141, the first clipboard service 141 stores the clipboard data 471 in the first clipboard manager 461.

From the perspective of the first application 131 and the first clipboard service 141, the copy operation behaves exactly as the scenario in FIG. 3. However, the first clipboard agent 151 behaves as a proxy for the store command and enhances the copy operation to support coordination between the first OS domain 111 and second OS domain 112. The first clipboard agent 151 may also send a notification 403 to the second clipboard agent 152 to indicate that a store command has been processed in the first OS domain 111. Both the first clipboard agent 151 and second clipboard agent 152 may store indicators regarding which OS domain most recently processed a store command. Since the store command 401 occurred in the first OS domain 111, both the first clipboard agent 151 and second clipboard agent 152 will indicate the first OS domain 111 as the "most recent clip domain." This information may be used subsequently when processing a paste operation in either domain. Since a user of the electronic device 100 may switch easily between the first OS domain 111 and second OS domain 112, the user may not care which domain was active when the last copy operation was performed. The user may simply expect the most recent copy operation to be reversed whenever a paste operation is performed in any domain.

In some embodiments, the second clipboard agent 152 receives the notification 403 and causes a dummy reference data 472 to be stored by the second clipboard service 142. For example, the second clipboard agent 152 may send a store command 404 to the second clipboard service 142 to cause the dummy reference data 472 to be stored in the second clipboard manager 462. The dummy reference data 472 may be null data in some implementations. Alternatively, the dummy reference data 472 may include information regarding which domain (i.e., the first OS domain 111) sent the notification 403 to the second clipboard agent 152. The dummy reference data 472 may include timestamp data or other information regarding the store command.

Having described the copy operation of FIG. 4, FIGS. 5 and 6 will be described relying on the state of the first clipboard manager 461 and second clipboard manager 462 after the copy operation.

Figure 5:
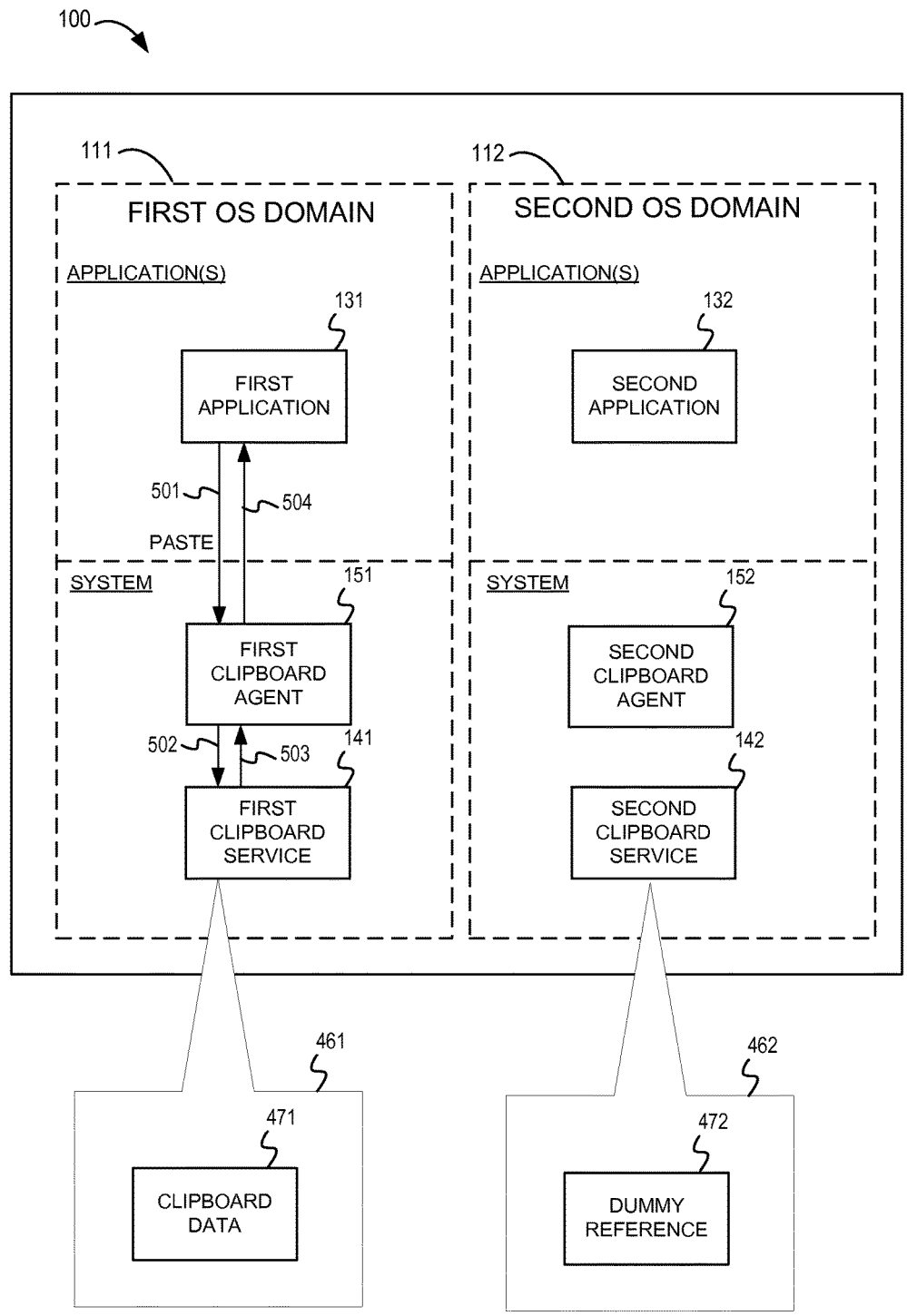
FIG. 5 depicts an electronic device retrieving content from a clipboard service via an associated clipboard agent in the same domain as the clipboard service in accordance with an embodiment of this disclosure.

FIG. 5 depicts the electronic device 100 performing a paste operation from the first application 131. The first application 131 is in the first OS domain 111, which is also the most recent clip domain. The first application 131 sends a clipboard request 501. The clipboard request 501 is received or intercepted by the first clipboard agent 151. The first clipboard agent 151 determines which OS domain has most recently stored content in a corresponding clipboard service. In the example of FIG. 5, the first clipboard agent 151, processing a clipboard request 501 from the first application 131, will determine whether the first clipboard service 141 of the first OS domain 111 or the second clipboard service 142 of the second OS domain 112 has most recently stored content. Since the first OS domain 111 is the most recent clip domain in our example, the first clipboard agent 151 will forward a clipboard request 502 to the first clipboard service 141. The first clipboard service 141 will respond with a clipboard response 503 having the clipboard data 471. The first clipboard agent 151 may forward the clipboard response 504 to the first application 131.

Figure 6:
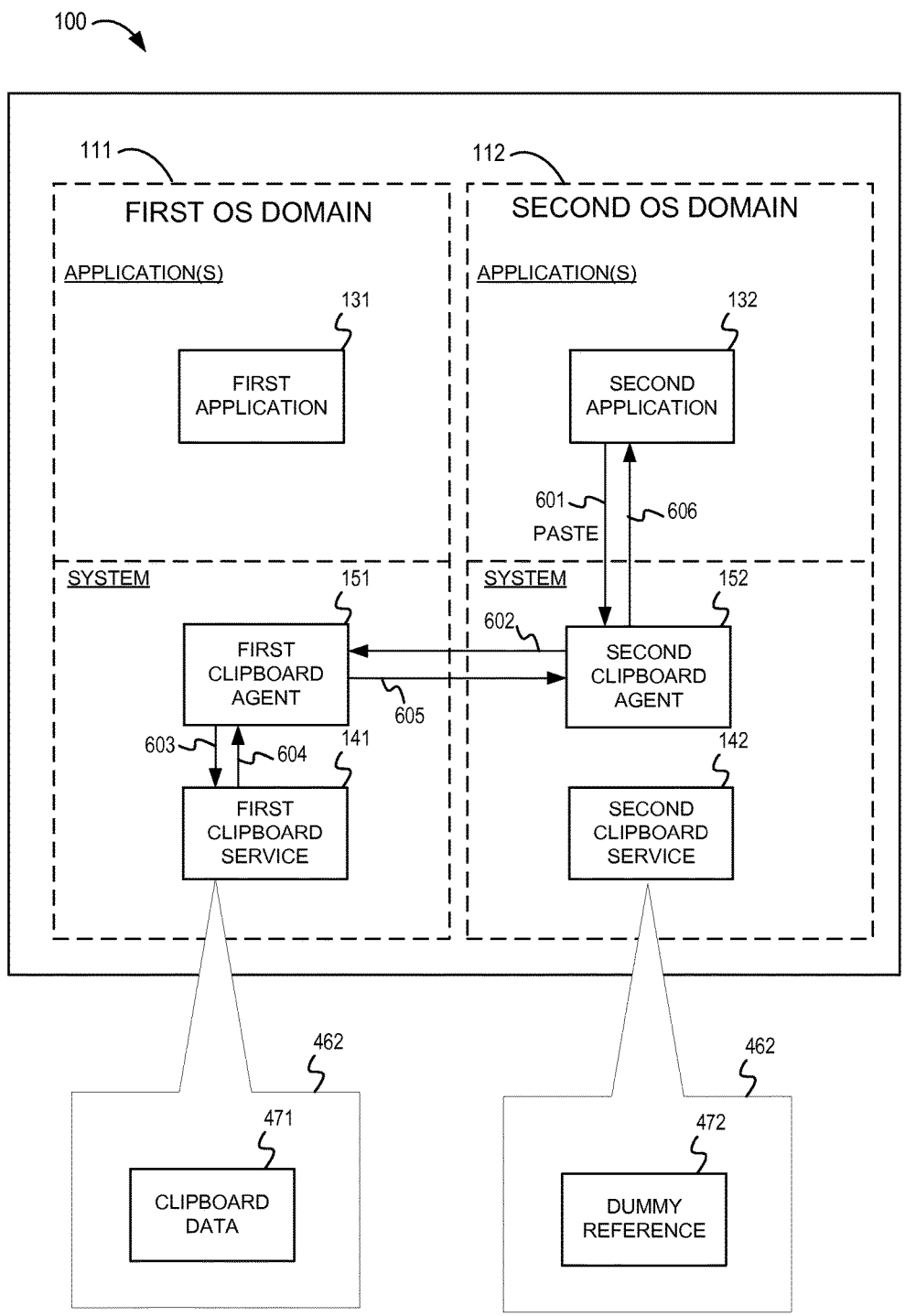
FIG. 6 depicts an electronic device retrieving content via an associated clipboard agent in the different domain as the clipboard service in accordance with an embodiment of this disclosure.

FIG. 6 depicts another scenario of a paste operation in the electronic device 100. In FIG. 6, the second application 132 is performing a paste operation. The second application 132 sends a clipboard request 601 directed at the second clipboard service 142. The second clipboard agent 152 receives the clipboard request 601 on behalf of the second clipboard service 142. The second clipboard agent 152 determines that the most recent store command was performed in the first OS domain 111. Therefore, instead of sending the clipboard request to the second clipboard service 142, the second clipboard agent 152 sends a cross-domain request 602 to the first clipboard agent 151. In one embodiment, the second clipboard agent 152 may prevent a clipboard request (not shown) from being sent to the second clipboard service 142. In another embodiment, the second clipboard agent 152 may send a clipboard request (not shown) to the second clipboard service 142 and will receive the dummy reference data 472 in response. The second clipboard agent 152 may be configured to interpret the dummy reference data 472 to determine which domain is associated with storing the dummy reference data 472.

In one embodiment, before sending the cross-domain request 602, the second clipboard agent 152 may determine whether the security permissions of the second OS domain 112 allows for incoming content from the first OS domain 111. Security policies enforced by the first clipboard agent 151 and second clipboard agent 152 may include either inflows, or outflows, or both, of content for the first OS domain 111 and second OS domain 112, respectively.

The first clipboard agent 151 receives the cross-domain request 602. The first clipboard agent 151 may determine whether the permissions of the first OS domain 111 allow the first clipboard agent 151 to send content to the second OS domain 112. In the example of FIG. 6, the permissions allow for the sharing of content from the first OS domain 111 to the second OS domain 112. The first clipboard agent 151 may send a clipboard request 603 to the first clipboard service 141 to request the clipboard data 471 from the second clipboard manager 462. The first clipboard service 141 may send a clipboard response 604 including the clipboard data 471.

The first clipboard agent 151 sends the clipboard data 471 in a cross-domain response 605 to the second clipboard agent 152. The second clipboard agent 152 may send clipboard response 606 to the second application 132 upon receiving the cross—domain response 605.

In one embodiment, the clipboard data 471 is not sent, but a memory address or identifier may be sent which allows the second clipboard agent 152 or the second application 132 to retrieve the clipboard data 471. In one embodiment, the first clipboard agent 151 may check other security parameters before sending the cross-domain response 605. For example, the first clipboard agent 151 may check the content in the clipboard data 471 for keywords associated with restricting the sharing of data. Keywords such as "confidential," "restricted," or "for office use only" may cause the first clipboard agent 151 to prevent the sharing of the clipboard data 471 if the keywords are found in the clipboard data 471. Alternatively, the first clipboard agent 151 may enforce permissions based on meta-data regarding the clipboard data 471.

The first clipboard agent 151 may mediate cross-domain access to the first clipboard service based at least in part on permissions associated with the first OS domain. Further examples of permissions are described in relation to FIG. 10. It should be noted that the permissions may be changed at any time, including even after the clipboard data 471 was stored in the first clipboard service 141 by the first application 131. The permissions are used to determine whether to respond to the cross-domain request 602 at the time of the paste operation. Illustrated in FIG. 6, the permission is such that the first OS domain 111 permits the transfer of clipboard data 471 from the first OS domain 111 to the second OS domain 112. Another example permission might include the first OS domain 111 permitting the sharing of the clipboard data 471 but may store a copy (log) of the clipboard data 471 for later review by an administrator. The log of the clipboard data 471 may be kept securely in the domain which is permitting data to leave the domain.

Another example permission might be to reject the outflow (exfiltration) of the clipboard data 471. For example, the first clipboard agent 151 may determine that the first OS domain 111 is "locked" at the time that the cross-domain request 602 is received. To enforce the security of the locked domain, the first clipboard agent 151 may reject the cross-domain request 602. The first clipboard agent 151 may send a rejection indicator (not shown) or a null data response (not shown) in response to the cross-domain request 602.

Figures 7A, 7B:
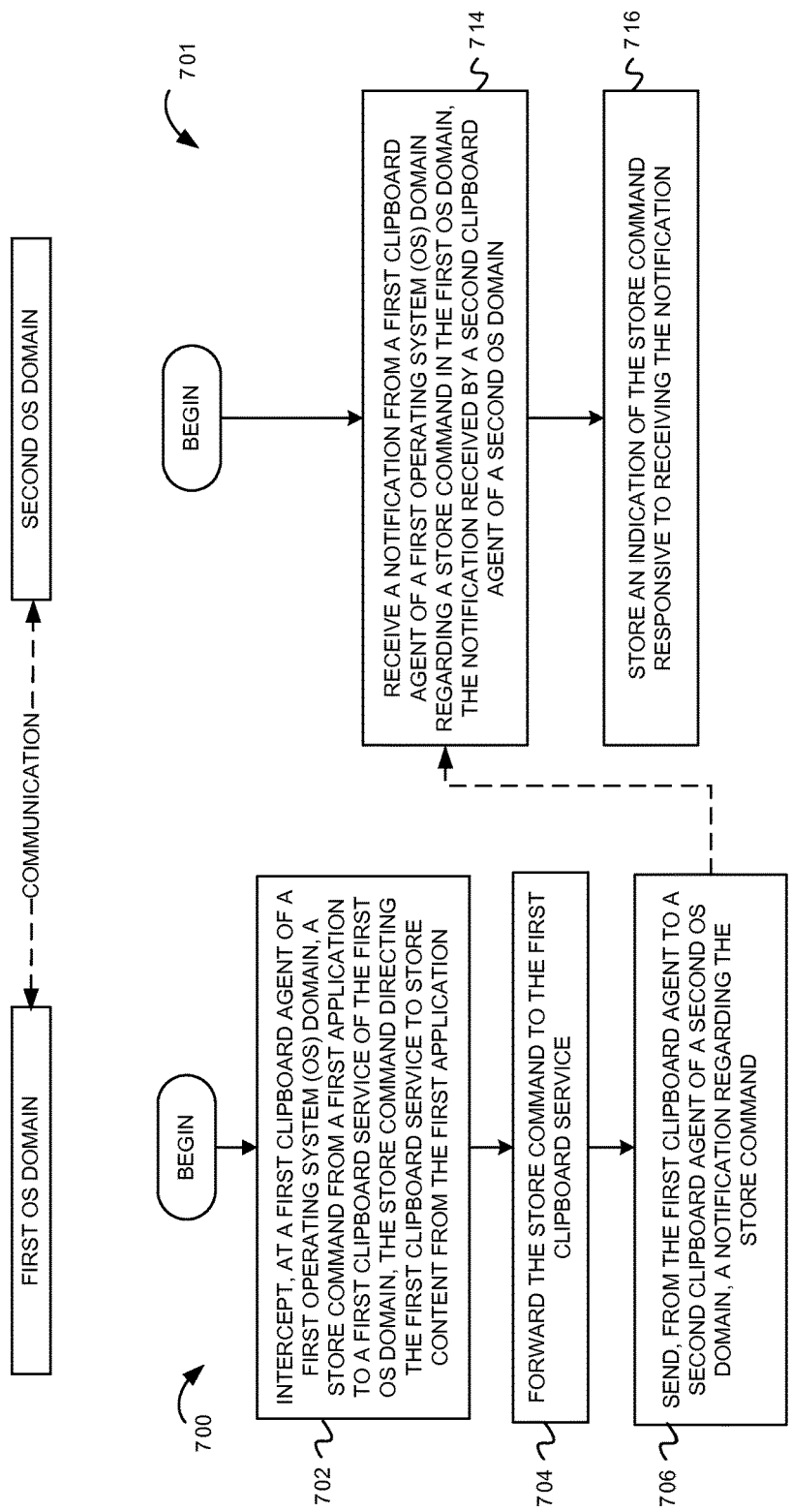
FIGS. 7A-7B depict flow diagrams associated with clipboard agents in different OS domains in accordance with an embodiment of this disclosure.

FIGS. 7A-7B illustrate example operations associated with storing content in a first clipboard service in a first OS domain. An inter-process communication allows the first clipboard agent and the second clipboard agent to coordinate information regarding the store command in the first OS domain.

FIG. 7A is a flow diagram (flow 700) showing operations performed by a first clipboard agent associated with a store command in a first OS domain. At block 702, the first clipboard agent of a first OS domain may receive a store command from a first application on behalf of a first clipboard service of the first OS domain, the store command directing the first clipboard service to store content from the first application. At block 704, the first clipboard agent may forward the store command to the first clipboard service. At block 706, the first clipboard agent may send, from the first clipboard agent to a second clipboard agent of a second OS domain, a notification regarding the store command. The notification may include information, such as a timestamp, data type, metadata, etc. In one embodiment, the notification does not include the data being stored in the first clipboard service.

FIG. 7B is a flow diagram (flow 701) showing operations performed by the second clipboard agent. At block 714, the second clipboard agent may receive a notification from a first clipboard agent of a first operating system (OS) domain regarding a store command in the first OS domain. At block 716, the second clipboard agent may store an indication of the store command responsive to receiving the notification.

Figure 8:
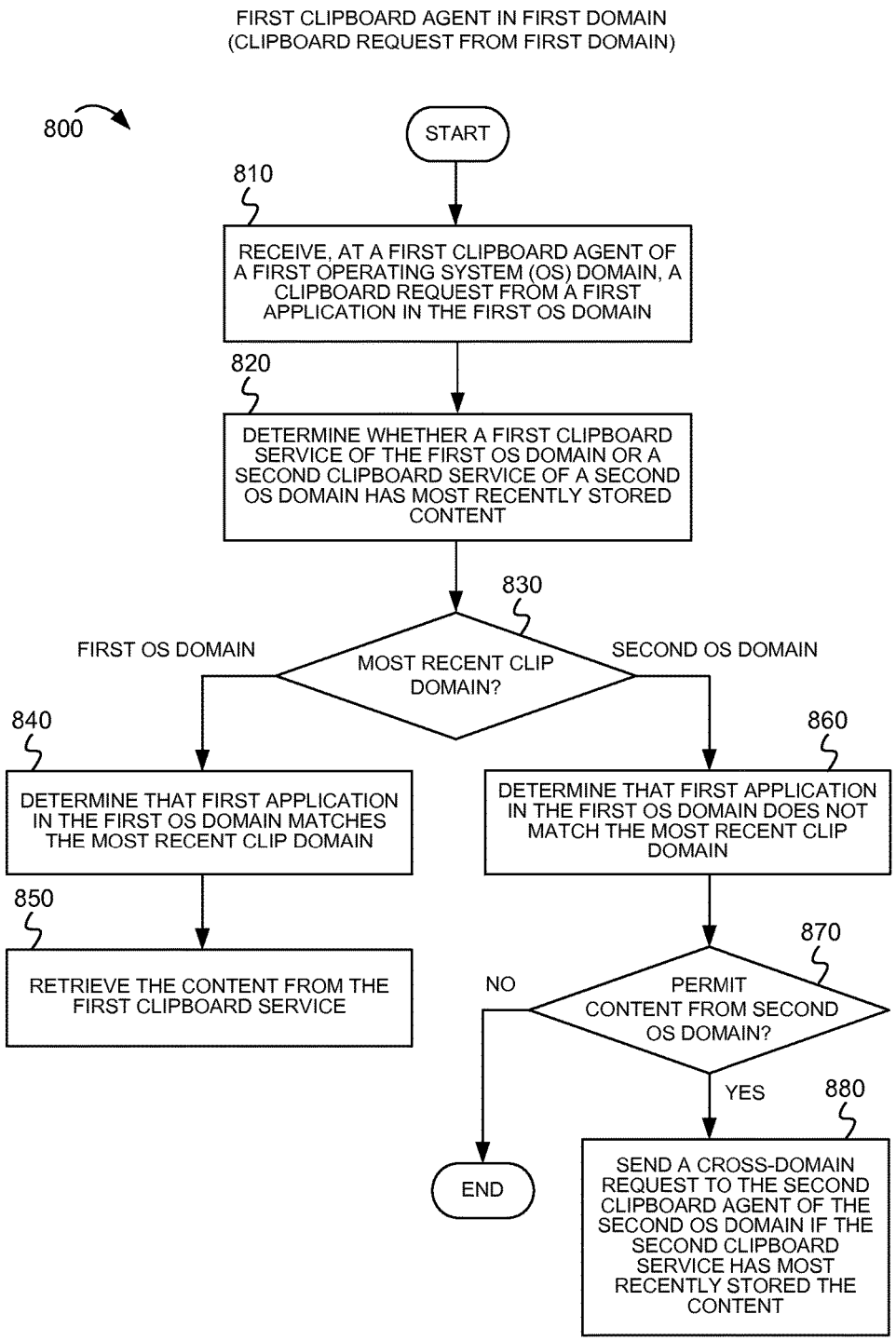
FIG. 8 depicts a flow diagram of a first clipboard agent in a first OS domain processing a paste request from the first domain in accordance with an embodiment of this disclosure.
Figure 9:
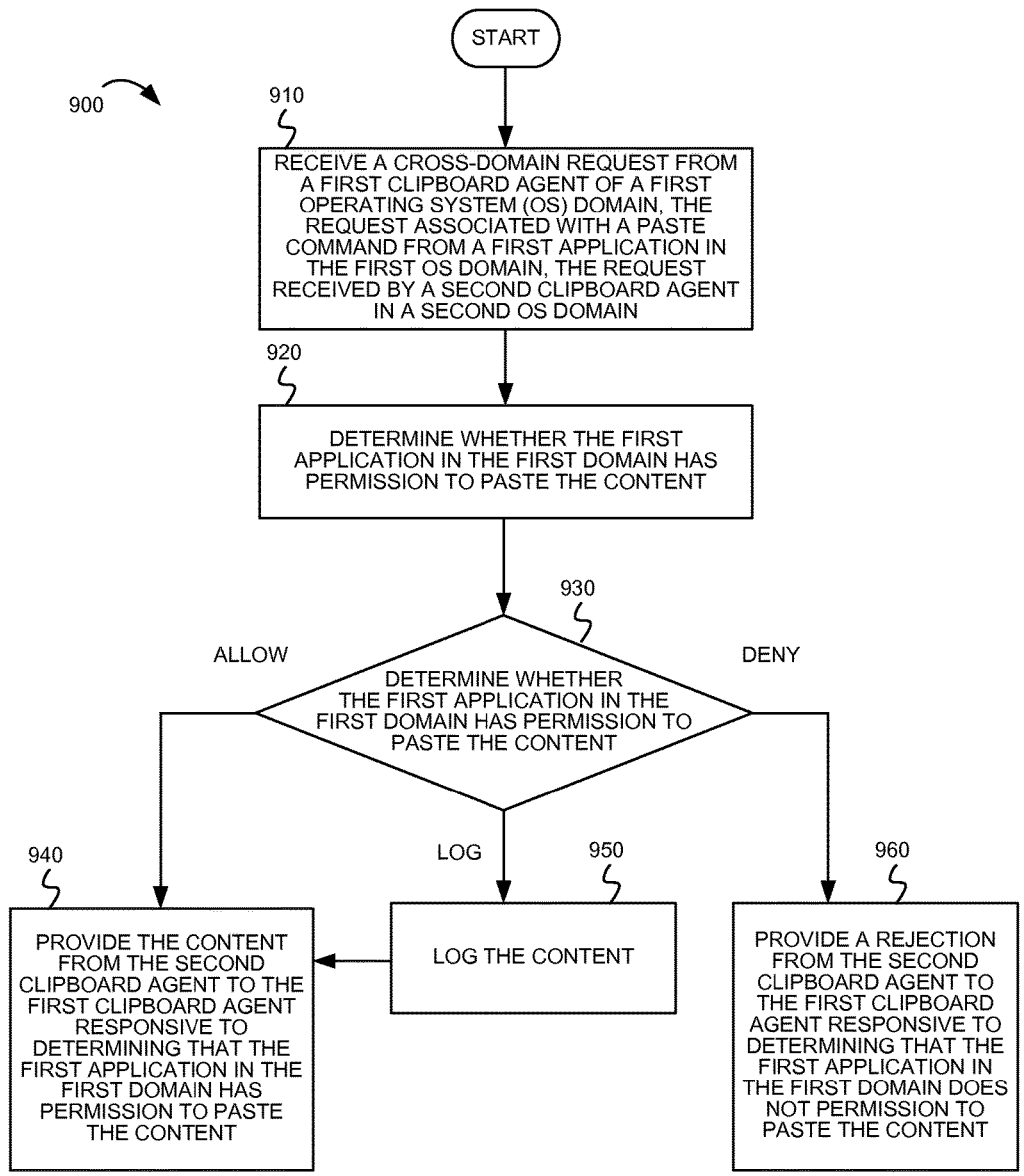
FIG. 9 depicts a flow diagram of a second clipboard agent in a second OS domain processing a cross-domain request from a first clipboard agent in a first domain in accordance with an embodiment of this disclosure.

FIGS. 8-9 illustrate example operations associated with processing clipboard requests at a first clipboard service and second clipboard service, respectively.

FIG. 8 depicts a flow diagram (flow 800) of a first clipboard agent in a first OS domain processing a clipboard request from the first domain in accordance with an embodiment of this disclosure. At block 810, the first clipboard agent may receive, at a first clipboard agent of a first operating system (OS) domain, a clipboard request from a first application in the first OS domain. The first clipboard agent and first application are in the same domain (the first OS domain) in this example.

At block 820, the first clipboard agent may determine whether a first clipboard service of the first OS domain or a second clipboard service of a second OS domain has most recently stored content. At decision 830, if the first OS domain is the most recent clip domain, the flow 800 continues to block 840. At block 840, the first clipboard agent may determine that first application in the first OS domain matches the most recent clip domain. At block 850, the first clipboard agent may retrieve the content from the first clipboard service. For example, the first clipboard agent may send a clipboard request to the first clipboard service.

Returning to decision 830, if the second OS domain is the most recent clip domain, the flow 800 continues to block 860. At block 860, the first clipboard service may determine that first application in the first OS domain does not match the most recent clip domain. The first clipboard agent may determine, at decision 870, whether the permissions of the first OS domain permit copied content from the second OS domain. If the first OS domain does not permit copied content from the second OS domain, the flow 800 may end. If the first OS domain does permit copied content from the second OS domain, the flow 800 may continue to block 880.

At block 880, the first clipboard agent may send a cross-domain request to the second clipboard agent of the second OS domain to obtain the clipboard data from the second clipboard service.

FIG. 9 depicts a flow diagram (flow 900) of a second clipboard agent in a second OS domain processing a cross-domain request from a first clipboard agent in a first domain in accordance with an embodiment of this disclosure.

At block 910, the second clipboard agent may receive a cross-domain request from a first clipboard agent of a first operating system (OS) domain, the request associated with a paste command from a first application in the first OS domain. At block 920, the second clipboard agent may determine whether the first application in the first domain has permission to paste the content. Three common permissions settings are illustrated in FIG. 9. Other permission settings are described in FIG. 10.

At decision 930, the second clipboard agent may determine whether the second OS domain permissions allow for the content to be shared with the first OS domain. Other permissions or security parameters (not shown) may be used to determine whether the first application in the first domain has permission to paste the content.

From decision 930, if the second OS domain allows the sharing of clipboard content with the first OS domain, the flow 900 continues to block 940. At block 940, the second clipboard agent may provide the content from the second clipboard agent to the first clipboard agent responsive to determining that the first application in the first domain has permission to paste the content.

From decision 930, if the second OS domain allows logged sharing of clipboard content with the first OS domain, the flow continues to block 950. At block 950, the second clipboard agent may log the content that is being shared. The flow 900 may then continue to block 940, where the content is shared.

From decision 930, if the second OS domain does not allow the sharing of clipboard content with the first OS domain, the flow 900 continues to block 960. At block 960, the second clipboard agent may provide a rejection from the second clipboard agent to the first clipboard agent responsive to determining that the first application in the first domain does not permission to paste the content.

FIG. 10 depicts example permissions 1000 in accordance with embodiments of this disclosure. The example permissions 1000 are intended as non-limiting examples of the types of permissions or security parameters that may be enforced by a clipboard agent of an OS domain. Other permissions may be readily conceived within the scope of this disclosure. Furthermore, the permissions may be used in various combinations. For example, the permissions may be domain-specific. In an electronic device having more than two domains, a permission may be specific for only a second OS domain, but not for a third OS domain.

Example permission 1010 is "allow." The permission may simply permit the release of date from an OS domain to another OS domain.

Example permission 1020 is "log." In this permission, data is released from a domain to another OS domain, but the released data is logged to enable a subsequent review by an administrator of the domain.

Example permission 1030 is "deny." This permission does not permit the release of data from a first domain to a second domain.

A wide variety of permissions may be defined to manage the exfiltration of data from a first domain. At example permission 1040, a keyword-based permission may be associated with releasing data from the domain only if the data does not include certain keywords (e.g., "Confidential," "Restricted," or the like).

At example permission 1050, an application-specific permission may be defined. For example, permission may be granted or denied based on either a source application (that stored the clipboard data) or destination application (that is requesting the clipboard data).

At example permission 1060, a time-specific permission may be defined. Permission granted during specified days and/or times. For example, the time-specific permission may be defined so that the sharing of data is limited to a work shift of a user of the device.

At example permission 1070, a location-specific permission may be defined. For example, permission may be granted when the electronic device is at specified locations, such as a work location. The location-specific permission may be geographic, such as country-specific. The location-specific permission may also be based on proximity to a location, such as within a wireless coverage range of a location.

At example permission 1080, a meta-data based permission may be defined. For example, permission may be granted or denied based on meta-data regarding the clipboard data. Meta-data may describe a variety of properties of the clipboard data, such as timestamp, data type, security policy, source application, etc.

At example permission 1090, other content-based permissions may be defined. For example, the content-based permissions may describe different permissions for content parts or content variants. An application may store different variations (versions) of content (e.g., also referred to as "alternate content") in a clipboard service. For example, the variations may be multiple versions of the same content, such as a HTML version, a plain text version, a rich text formatted version, etc. Content-based permissions may cause a clipboard agent to return one of the variations rather than another. For example, depending on the domain which is requesting the content, one of the versions may be shared rather than a different version. As an example, location data may be stored in the clipboard service; the location data may be stored as different versions of the location data. The different versions of the location data may have different levels of accuracy. Depending on the content-based permissions, and the requesting domain, the clipboard agent may share a low-accuracy version of the location data or a high-accuracy version of the location data.

Figure 11:
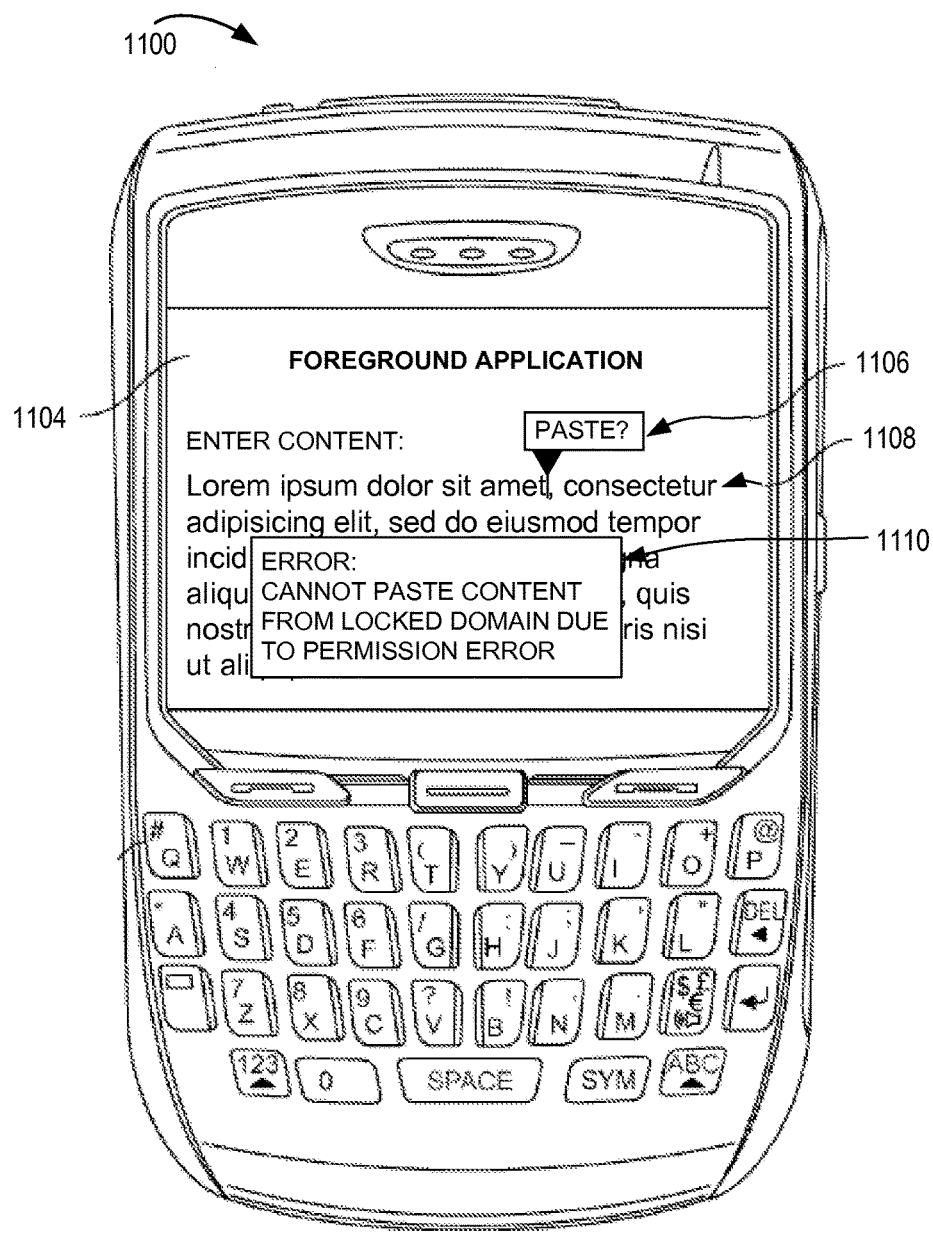
FIG. 11 depicts an electronic device denying a paste request based on permissions in accordance with an embodiment of this disclosure.

FIG. 11 depicts an electronic device 1100 denying a paste request based on permissions. An application is being presented via a user interface 1104 of the electronic device 1100. The user interface 1104 may comprise a display, monitor, touchscreen, or the like. The application is considered to be a "foreground application" because it is currently active on the user interface 1104 for user interaction. An input area 1108 provides an area for the user to enter text. Shown in FIG. 11, a paste request 1106 is being generated. The paste request 1106 may cause a clipboard request to be sent to a foreground OS domain. A clipboard agent in the foreground OS domain may communicate with a corresponding clipboard agent in another OS domain to retrieve the most recent clipboard data. However, due to permission settings of the other OS domain, the cross-domain request was rejected.

A user notification 1110 may be presented to the user to inform the user that the paste operation failed due to security or permissions failure. For example, the user notification 1110 may indicate that the content cannot be pasted because it was copied from a secure or locked domain. The user notification 1110 may be referred to as a toast or dialog presented via the user interface 1104 to the user.

Figure 12A:
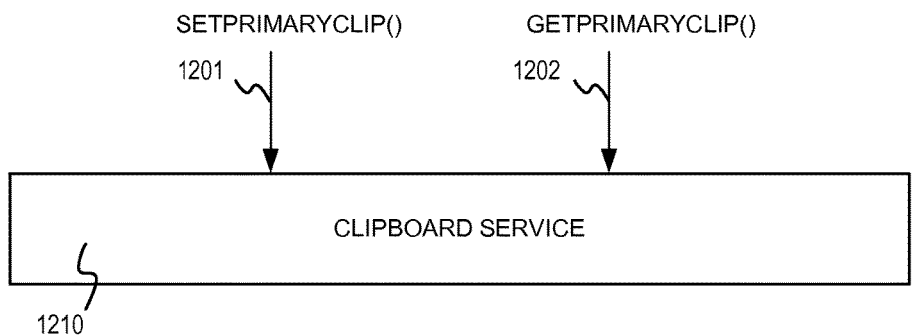
FIG. 12A depicts an implementation of a clipboard service in accordance with an embodiment of this disclosure.

FIG. 12A depicts an implementation of a clipboard service 1210 in accordance with an embodiment of this disclosure. The clipboard service 1210 may provide defined clipboard commands (which may be referred to as operations, methods, functions, etc.) A SetPrimaryClip command 1201 may be associated with storing content in the clipboard service 1210. For example, the SetPrimaryClip command 1201 may be an example of a store command. A SetPrimaryClip command 1201 may be associated with retrieving content from the clipboard service 1210. For example, the SetPrimaryClip command 1201 may be an example of a clipboard request.

Figure 12B:
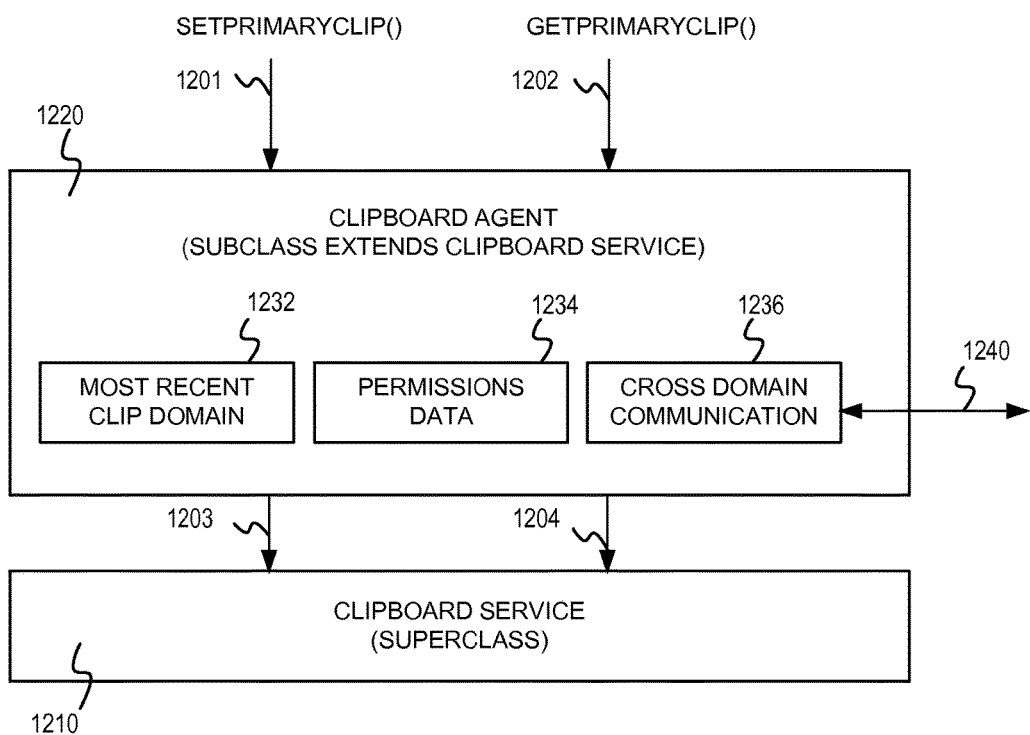
FIG. 12B depicts an implementation of a clipboard agent in accordance with an embodiment of this disclosure.

FIG. 12B depicts an implementation of a clipboard agent 1220 in accordance with an embodiment of this disclosure. The clipboard agent 1220 may be referred to as a wrapper, proxy, or subclass due to its relationship to the clipboard service 1210. For example, the clipboard agent 1220 may be defined as a "subclass" that extends a "superclass" representing the clipboard service. The clipboard agent 1220 may be configured to receive the SetPrimaryClip command 1201 and GetPrimaryClip command 1202 on behalf of the clipboard service 1210. When forwarding the SetPrimaryClip command 1201 is appropriate, the clipboard agent 1220 may send a super.SetPrimaryClip command 1203 to the clipboard service 1210. When forwarding the GetPrimaryClip command 1202 is appropriate, the clipboard agent 1220 may send a super.GetPrimaryClip command 1204 to the clipboard service 1210.

The clipboard agent 1220 may also store an indicator associated with a most recent clip domain 1232. The most recent clip domain 1232 may be stored in memory (not shown) associated with the clipboard agent 1220. The clipboard agent 1220 also has access to permissions data 1234 defining permissions associated with the OS domain in which the clipboard agent 1220 is running. The clipboard agent 1220 also supports cross domain communication 1236 to another clipboard agent (not shown) in another domain. The cross domain communication 1236 may utilize a protocol 1240 defined for inter-process communications between the clipboard agent 1220 and the other clipboard agents executing on the electronic device.

Figure 13:
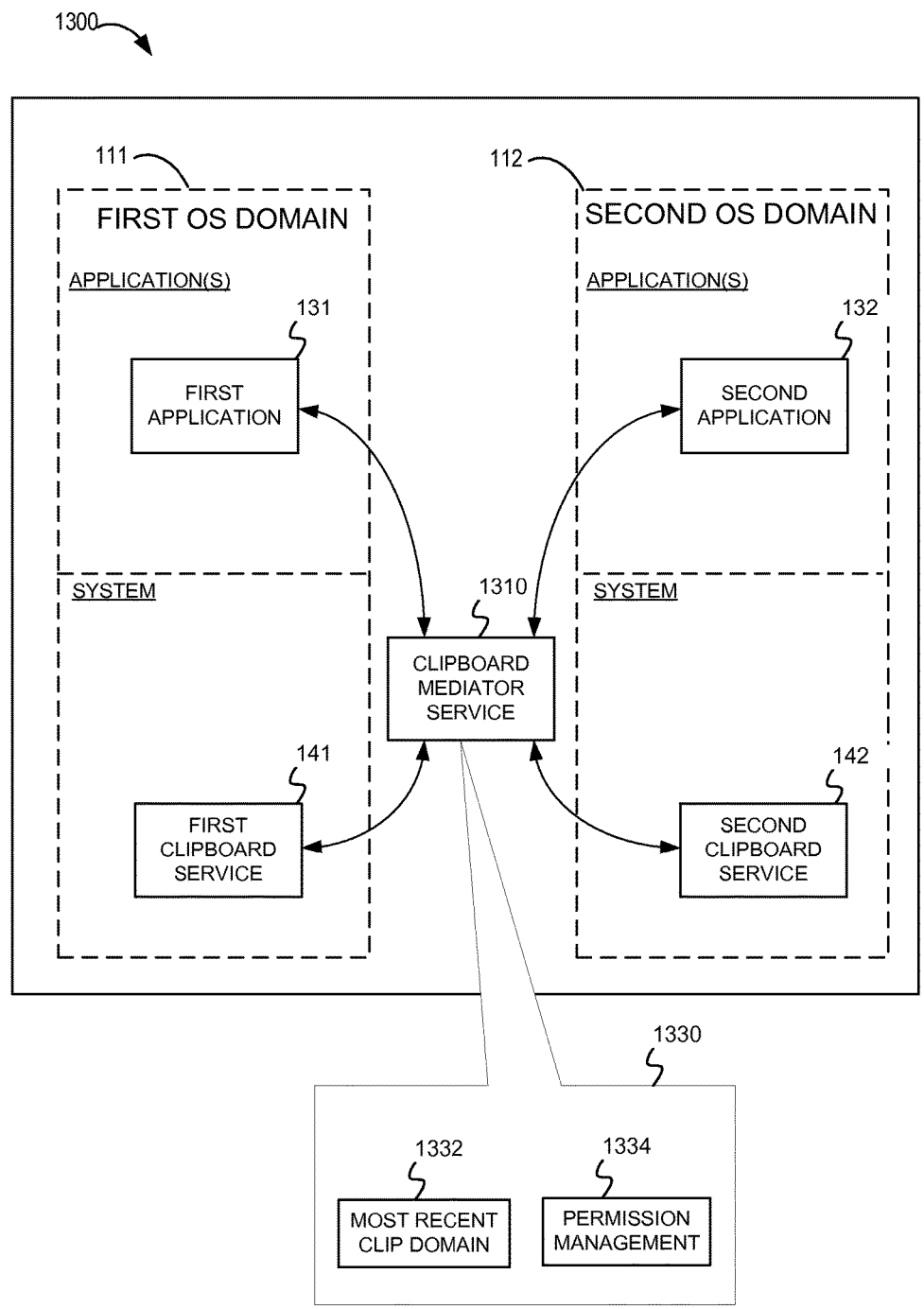
FIG. 13 depicts an electronic device implementing a clipboard mediator service in accordance with an embodiment of this disclosure.

FIG. 13 depicts an electronic device implementing a clipboard mediator service 1310 in accordance with an embodiment of this disclosure. In the previous figures and examples, each OS domain implemented separate clipboard agents to enforce the security permissions of the respective OS domain. In one embodiment, an electronic device may implement a central coordinator between multiple OS domains. For example, a hybrid domain or central domain may be trusted to manage permissions for other domains operating on the electronic device. The clipboard mediator service 1310 may be executed in a central domain (not shown) of the electronic device 1300. Illustrated in FIG. 13, the clipboard mediator service 1310 may be outside from the first OS domain 111 and the second OS domain 112. In one embodiment, the clipboard mediator service 1310 may be in one of the first OS domain 111 or the second OS domain 112.

The clipboard mediator service 1310 may be trusted by both OS domains to mediate clipboard access from the OS domains. For example, the first application 131 and second application 132 may send clipboard commands that are intercepted by the clipboard mediator service 1310. The clipboard mediator service 1310 may then determine which OS domain is the most recent clip domain. For example, the clipboard mediator service 1310 may store the most recent clip domain 1332 in a clipboard manager 1330. The clipboard mediator service 1310 may also perform permission management 1334 for multiple OS domains. For example, permissions data may be stored at the clipboard manager 1330 to define which domains or applications are permitted to access clipboard services in other domains.

The clipboard mediator service 1310 may then communicate with the clipboard service (such as first clipboard service 141 or second clipboard service 142) in the most recent clip domain to retrieve the clipboard data on behalf of the requesting application.

Figure 14:
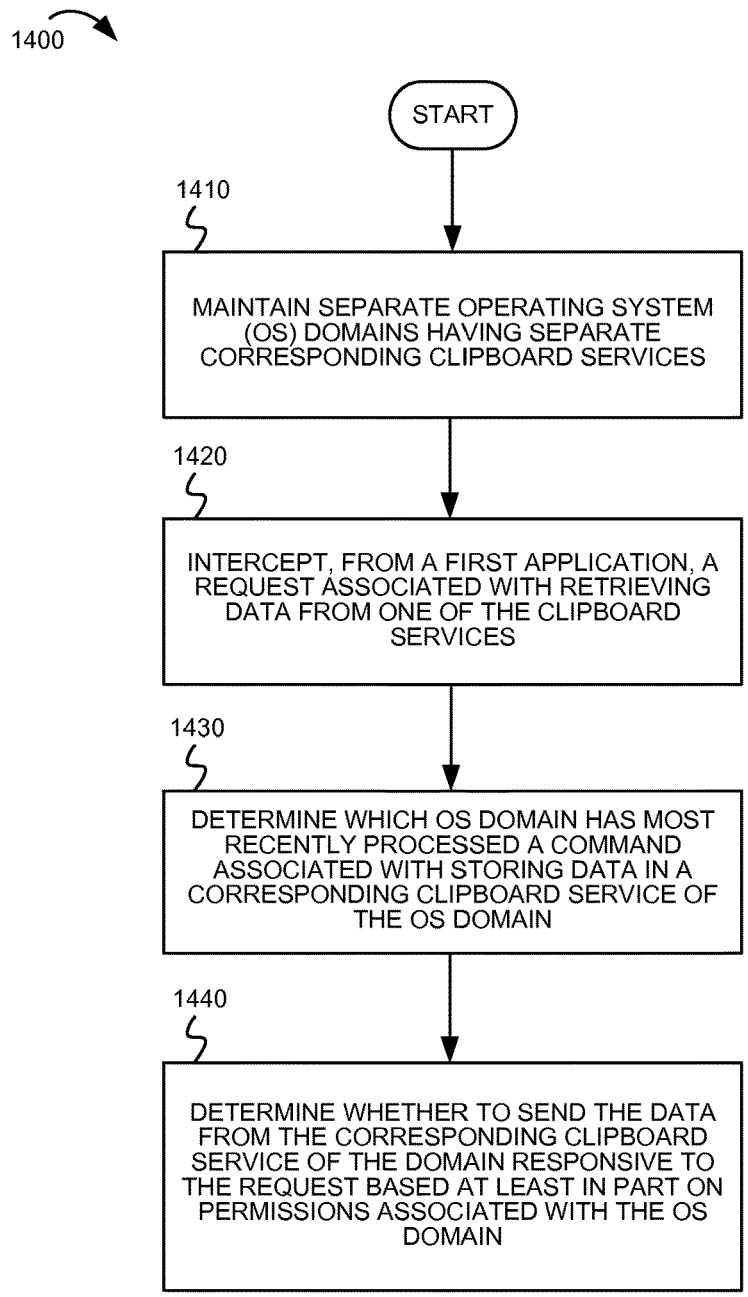
FIG. 14 depicts a flow diagram of an electronic device implementing a clipboard mediator service in accordance with an embodiment of this disclosure.

FIG. 14 depicts a flow diagram (flow 1400) for implementing a clipboard mediator service in accordance with an embodiment of this disclosure. At block 1410, an electronic device may maintain separate operating system (OS) domains having separate corresponding clipboard services. At block 1420, the electronic device may receive, from a first application, a request associated with retrieving data from one of the clipboard services. At block 1430, a clipboard mediator service may determine which OS domain has most recently processed a command associated with storing data in a corresponding clipboard service of the OS domain. At block 1440, the clipboard mediator service may determine whether to send the data from the corresponding clipboard service of the domain responsive to the request based at least in part on permissions associated with the OS domain.

The example sequence of operations described above are but one possible example of many possible sequences. Many other sequences are possible, with different operations and different ordering of operations. The embodiments are not limited to any particular ordering of operations.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 15:
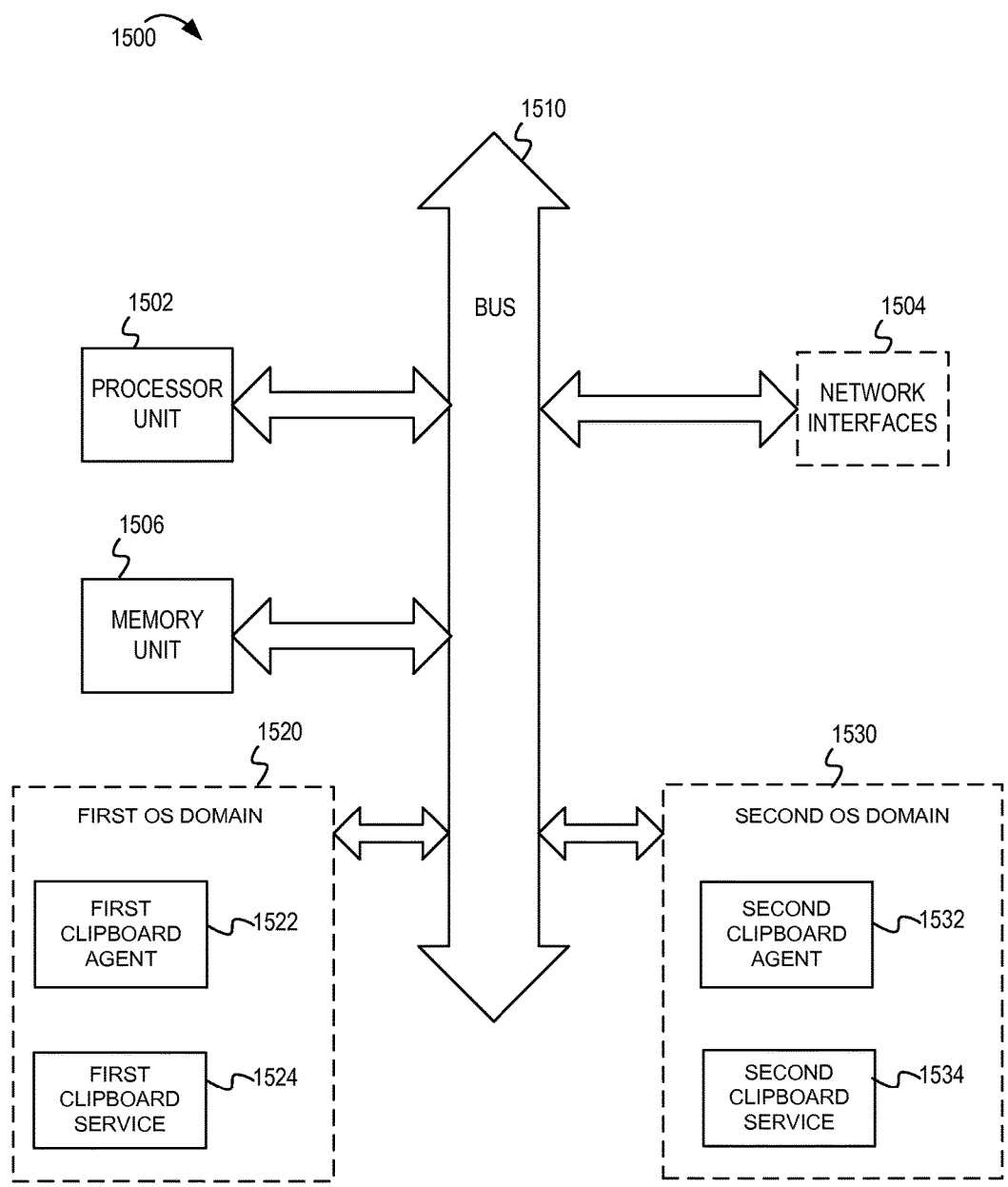
FIG. 15 depicts an electronic device having processor and memory capable of implementing various embodiments of this disclosure.

FIG. 15 depicts an example electronic device, according to some embodiments. FIG. 15 depicts an electronic device 1500 that can be an example of the electronic devices 100, 1100, 1300 described previously. The electronic device 1500 includes a processor 1502 (possibly including multiple processors, multiple cores, multiple nodes, and/or implementing multi-threading, etc.). The electronic device 1500 includes a memory 1506. The memory 1506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1510 (e.g., PCI, ISA, PCI-Express, HyperTransport®, InfiniBand®, NuBus, etc.), a network interface 1504 (e.g., an ATM interface, an Ethernet interface, a Frame Relay interface, SONET interface, wireless interface, etc.), and optionally may include a storage device(s) (e.g., optical storage, magnetic storage, etc.). The processor 1502, the network interface 1504, and the memory 1506 may be coupled to the bus 1510. Although illustrated as being coupled to the bus 1510, the memory 1507 may be coupled to the processor 1502.

The electronic device 1500 may implement a first OS domain 1520 and a second OS domain 1530. It is noted the other OS domains may also be implemented on the electronic device 1500. The OS domains may be implemented as machine readable instructions stored in the memory 1506 and executed by the processor 1502. The first OS domain 1520 may include a first clipboard agent 1522 and a first clipboard service 1524. The second OS domain 1530 may include a second clipboard agent 1532 and a second clipboard service 1534. The first clipboard agent 1522 and second clipboard agent 1532 may be capable of communicating with each other to coordinate regarding clipboard commands in the first OS domain 1520 and the second OS domain 1530. A first clipboard agent 1522 may mediate cross-domain access to the first clipboard service 1524 based at least in part on permissions associated with the first OS domain 1520. The first clipboard agent 1522 may implement functionality of various embodiments described above in the foregoing figures.

Some or all of the operations described herein may be implemented with code embodied in the memory and/or processor, co-processors, other cards, etc. Any one of these operations may be partially (or entirely) implemented in hardware and/or on the processor 1502. For example, the operations may be implemented with an application specific integrated circuit, in logic implemented in the processor 1502, in a co-processor on a peripheral device or card, etc. Further, realizations may include fewer or additional components not illustrated in FIG. 15 (e.g., video cards, audio cards, additional network interfaces, peripheral devices, etc.).

While the embodiments are described with reference to various implementations and exploitations, it will be understood that these embodiments are illustrative and that the scope of the subject matter is not limited to them. In general, techniques for cross-domain data sharing with permission control as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the subject matter.

In general, structures and functionality presented as separate components in the example configurations may be implemented as a combined structure or component. Similarly, structures and functionality presented as a single component may be implemented as separate components. These and other variations, modifications, additions, and improvements may fall within the scope of the subject matter.

What is claimed is:

1. A method performed on an electronic device, the method comprising:
    executing a first clipboard agent in a first operating system (OS) domain of the electronic device, the first clipboard agent associated with a first clipboard service of the first OS domain;
    coordinating between the first clipboard agent and a second clipboard agent of a second OS domain of the electronic device regarding clipboard commands in the first OS domain and the second OS domain;
    mediating, at the first clipboard agent, cross-domain access to the first clipboard service based at least in part on permissions associated with the first OS domain;
    receiving, at the first clipboard agent, a clipboard request from a first application in the first OS domain requesting to retrieve content from the first clipboard service;
    determining that the second OS domain has most recently processed a store command associated with storing the content in a corresponding clipboard service of the first and second OS domains; and
    sending a cross-domain request to the second clipboard agent to request the content from a second clipboard service in the second OS domain,
    wherein the first clipboard agent and the second clipboard agent separately enforce security parameters to limit access to content stored in the first clipboard service and the second clipboard service, respectively, the security parameters comprising at least one of:
    one or more keyword-based permissions specifying that access to content from the first or second clipboard service is restricted to content that does not contain one or more specific keywords;
    one or more time-specific permissions specifying that access to content from the first or second clipboard service is restricted to one or more specific days and/or times of the day; or
    one or more location-specific permissions specifying that access to content stored in the first or second clipboard service is restricted to when the electronic device is at one or more specific locations.

2. The method of claim 1, further comprising:
    receiving, at the first clipboard agent, a store command from the first application, the store command directing the first clipboard service to store content from the first application;
    forwarding the store command to the first clipboard service; and
    sending, from the first clipboard agent to the second clipboard agent of the second OS domain, a notification regarding the store command.

3. The method of claim 1, further comprising:
    receiving, at the first clipboard agent, a second clipboard request from a second application in the first OS domain;
    determining whether the first clipboard service of the first OS domain or the second clipboard service of the second OS domain has most recently stored content;

retrieving the content from the first clipboard service if the first clipboard service has most recently stored the content requested by the second application; and
sending a request to the second clipboard agent of the second OS domain if the second clipboard service has most recently stored the content requested by the second application.

4. The method of claim 1, further comprising:
receiving a notification from the second clipboard agent regarding a store command in the second OS domain; and
storing an indication of the store command responsive to receiving the notification.

5. The method of claim 4, wherein the indication comprises a dummy reference clip stored in the first clipboard service.

6. The method of claim 1, further comprising:
receiving, at the first clipboard agent, another clipboard request from the first application in the first OS domain requesting to retrieve content from the first clipboard service;
determining that the first OS domain has most recently processed a store command associated with storing content in a corresponding clipboard service of the first and second OS domains; and
sending the clipboard request to the first clipboard service responsive to determining that the first OS domain has most recently processed the store command.

7. The method of claim 1, further comprising, prior to sending the cross-domain request to the second clipboard agent:
determining whether to send the cross-domain request to the second clipboard agent based at least in part on whether the security parameters enforced by the first clipboard agent allow incoming data from the second OS domain.

8. The method of claim 1, further comprising:
receiving the content from the second clipboard agent responsive to the cross-domain request; and
sending the content to the first application.

9. The method of claim 1, further comprising:
receiving an indication from the second clipboard agent that the cross-domain request was rejected; and
presenting a notice of the rejection via a user interface if the first application is active in the user interface.

10. The method of claim 9, wherein the indication that the cross-domain request was rejected comprises receiving null content in response to the cross-domain request.

11. The method of claim 1, further comprising:
receiving a second cross-domain request from the second clipboard agent, the second cross-domain request associated with a request from a second application in the second OS domain to access content from the first clipboard service; and
determining whether the second application in the second domain has permission to access content from the first clipboard service based on the security parameters enforced by the first clipboard agent, the security parameters further comprising:
application-specific permissions specifying that access to content from the first or second clipboard service is permitted only for specific types of applications;
wherein the one or more time-specific permissions further specify that content-sharing between the first clipboard and second services is permitted during a work shift of a user of the electronic device; and
wherein the one or more location-specific permissions further specify that content-sharing between the first and second clipboard services is permitted when the electronic device is at a work location of the user.

12. The method of claim 11, further comprising:
providing the content to the second clipboard agent responsive to the first clipboard agent determining that the second application has permission to access the content based on the security parameters; and
providing a rejection to the second clipboard agent responsive to the first clipboard agent determining that the second application does not have permission to access the content based on the security parameters.

13. An electronic device, comprising:
one or more processors; and
one or more memory units configured to store instructions, which when executed by at least one of the one or more processors, cause the electronic device to,
execute a first clipboard agent in a first operating system (OS) domain of the electronic device, the first clipboard agent associated with a first clipboard service of the first OS domain,
coordinate between the first clipboard agent and a second clipboard agent of a second OS domain of the electronic device regarding clipboard commands in the first OS domain and the second OS domain,
mediate, at the first clipboard agent, cross-domain access to the first clipboard service based at least in part on permissions associated with the first OS domain,
receive, at the first clipboard agent, a clipboard request from a first application in the first OS domain requesting to retrieve content from the first clipboard service,
determine that the second OS domain has most recently processed a store command associated with storing the content in a corresponding clipboard service of the first and second OS domains, and
send a cross-domain request to the second clipboard agent to request the content from a second clipboard service in the second OS domain,
wherein the first clipboard agent and the second clipboard agent separately enforce security parameters to limit access to content stored in the first clipboard service and the second clipboard service, respectively, the security parameters comprising at least one of:
one or more keyword-based permissions specifying that access to content from the first or second clipboard service is restricted to content that does not contain one or more specific keywords;
one or more time-specific permissions specifying that access to content from the first or second clipboard service is restricted to one or more specific days and/or times of the day; or
one or more location-specific permissions specifying that access to content stored in the first or second clipboard service is restricted to when the electronic device is at one or more specific locations.

14. The electronic device of claim 13, wherein the one or more memory units are further configured to store instructions, which when executed by at least one of the one or more processors, cause the electronic device to:
receive, at the first clipboard agent, a store command from the first application, the store command directing the first clipboard service to store content from the first application;

forward the store command to the first clipboard service; and send, from the first clipboard agent to the second clipboard agent of the second OS domain, a notification regarding the store command.

15. The electronic device of claim 13, wherein the one or more memory units are further configured to store instructions, which when executed by at least one of the one or more processors, cause the electronic device to:
receive, at the first clipboard agent, a clipboard request from a second application in the first OS domain;
determine whether the first clipboard service of the first OS domain or the second clipboard service of the second OS domain has most recently stored content;
retrieve the content from the first clipboard service if the first clipboard service has most recently stored the content; and
send a request to the second clipboard agent of the second OS domain if the second clipboard service has most recently stored the content.

16. The electronic device of claim 13, wherein the one or more memory units are further configured to store instructions, which when executed by at least one of the one or more processors, cause the electronic device to:
receive a notification from the second clipboard agent regarding a store command in the second OS domain; and
store an indication of the store command responsive to receiving the notification.

17. The electronic device of claim 13, wherein the one or more memory units are further configured to store instructions, which when executed by at least one of the one or more processors, cause the electronic device to:
receive, at the first clipboard agent, a clipboard request from a second application in the first OS domain requesting to retrieve content from the first clipboard service; and
determine that the first OS domain has most recently processed a store command associated with storing content in a corresponding clipboard service of the first and second OS domains; and
send the clipboard request to the first clipboard service.

18. The electronic device of claim 13, wherein the one or more memory units are further configured to store instructions, which when executed by at least one of the one or more processors, cause the electronic device to, prior to sending the cross-domain request to the second clipboard agent:
determine whether to send the cross-domain request to the second clipboard agent based at least in part on whether permissions of the first OS domain allow incoming data from the second OS domain.

19. The electronic device of claim 13, wherein the one or more memory units are further configured to store instructions, which when executed by at least one of the one or more processors, cause the electronic device to:
receive the content from the second clipboard agent responsive to the cross-domain request; and
send the content to the first application.

20. The electronic device of claim 13, wherein the one or more memory units are further configured to store instructions, which when executed by at least one of the one or more processors, cause the electronic device to:
receive an indication from the second clipboard agent that the cross-domain request was rejected; and
present a notice of the rejection via a user interface if the first application is active in the user interface.

21. The electronic device of claim 13, wherein the one or more memory units are further configured to store instructions, which when executed by at least one of the one or more processors, cause the electronic device to:
receive a cross-domain request from the second clipboard agent, the cross-domain request associated with a paste command from a second application in the second OS domain; and
determine whether the second application in the second domain has permission to access content from the first clipboard service.

22. The electronic device of claim 21, wherein the one or more memory units are further configured to store instructions, which when executed by at least one of the one or more processors, cause the electronic device to:
provide the content to the second clipboard agent responsive to determining that the second application has permission to paste the content; and
provide a rejection to the second clipboard agent responsive to determining that the second application does not have permission to paste the content.

23. A non-transitory machine readable medium having stored thereon executable instructions for causing one or more processors to perform operations comprising:
executing a first clipboard agent in a first operating system (OS) domain of an electronic device, the first clipboard agent associated with a first clipboard service of the first OS domain;
coordinating between the first clipboard agent and a second clipboard agent of a second OS domain of the electronic device regarding clipboard commands in the first OS domain and the second OS domain;
mediating, at the first clipboard agent, cross-domain access to the first clipboard service based at least in part on permissions associated with the first OS domain;
receiving, at the first clipboard agent, a clipboard request from a first application in the first OS domain requesting to retrieve content from the first clipboard service;
determining that the second OS domain has most recently processed a store command associated with storing the content in a corresponding clipboard service of the first and second OS domains; and
sending a cross-domain request to the second clipboard agent to request the content from a second clipboard service in the second OS domain,
wherein the first clipboard agent and the second clipboard agent separately enforce security parameters to limit access to content stored in the first clipboard service and the second clipboard service, respectively, the security parameters comprising at least one of:
one or more keyword-based permissions specifying that access to content from the first or second clipboard service is restricted to content that does not contain one or more specific keywords;
one or more time-specific permissions specifying that access to content from the first or second clipboard service is restricted to one or more specific days and/or times of the day; or
one or more location-specific permissions specifying that access to content stored in the first or second clipboard service is restricted to when the electronic device is at one or more specific locations.

24. The non-transitory machine readable medium of claim 23, said operations further comprising:

receiving, at the first clipboard agent, a store command from the first application, the store command directing the first clipboard service to store content from the first application;

forwarding the store command to the first clipboard service; and sending, from the first clipboard agent to the second clipboard agent of the second OS domain, a notification regarding the store command.

25. The non-transitory machine readable medium of claim 23, said operations further comprising:

receiving, at the first clipboard agent, a clipboard request from a second application in the first OS domain requesting to retrieve content from the first clipboard service; and determining that the first OS domain has most recently processed a store command associated with storing content in a corresponding clipboard service of the first and second OS domains; and sending the clipboard request to the first clipboard service.

26. The non-transitory machine readable medium of claim 23, said operations further comprising:

receiving a second cross-domain request from the second clipboard agent, the second cross-domain request associated with a paste command from a second application in the second OS domain; and determining whether the second application in the second domain has permission to access content from the first clipboard service.

27. The electronic device of claim 13, further comprising a clipboard mediator service implemented by the electronic device to perform the coordinating between the first clipboard agent and the second clipboard agent, wherein the clipboard mediator service is implemented in a central domain that is separate from the first and second OS domains.

* * * * *